April 16, 1946.　　W. F. MAYER　　2,398,655
AIR CONDITIONER FOR AIRCRAFT CABINS
Filed May 15, 1944　　2 Sheets-Sheet 1

INVENTOR.
WALDEMAR F. MAYER
BY
ATTORNEY

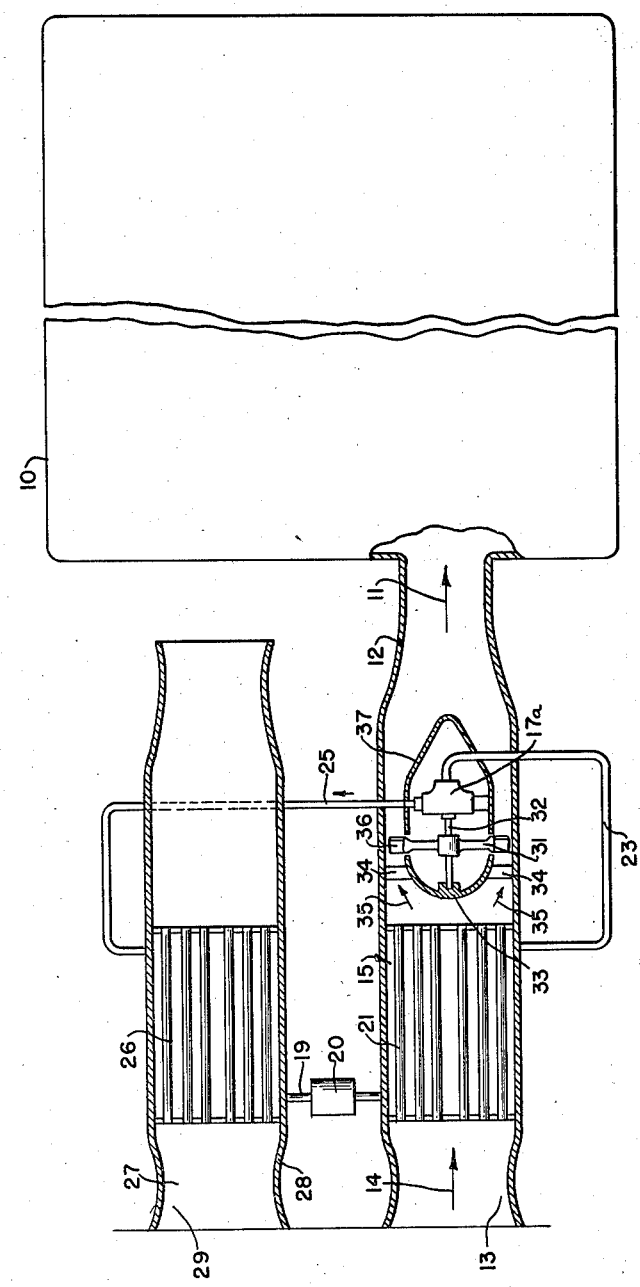

Patented Apr. 16, 1946

2,398,655

UNITED STATES PATENT OFFICE 2,398,655

AIR CONDITIONER FOR AIRCRAFT CABINS

Waldemar F. Mayer, Los Angeles, Calif., assignor to The Garrett Corporation, Airesearch Manufacturing Company Division, Los Angeles, Calif., a corporation of California Application May 15, 1944, Serial No. 535,617

10 Claims. (Cl. 62—129)

My invention relates to a simple means for cooling the air which is delivered into an aircraft cabin during flight, and relates in particular to a device wherein the movement of the inflowing air provides force for operation of the refrigerating equipment.

It is necessary to replenish the air in an aircraft cabin to replace oxygen consumed by cabin occupants. In a high speed airplane the comparatively still atmospheric air must be accelerated during its passage into the cabin to the speed of the airplane with the result that the air is heated. At a speed of 400 miles per hour, the work done in accelerating the air to cabin velocity heats the air about 30° F. above the temperature at which it originally existed in the atmosphere. One test showed that the increasing of the speed of atmospheric air at 100° F., from zero to 400 miles per hour, produced an increase in the air temperature to 128.6° F., that the bringing of air speed to 300 miles per hour produced an air temperature of 116° F. and that the increase in the velocity of the air to 200 miles per hour increased its temperature to 107.8° F. Therefore, the ramming of air into an aircraft cabin results in temperatures in the cabin not conducive to passenger comfort, and in many instances not to be regarded as livable.

It is an object of the present invention to provide a means for ramming air into an aircraft cabin, having means for cooling the air which derives power for its operation from the inflowing air and which also cools the air by reason of the absorption of power from the moving air, such power absorption absorbing heat and thereby contributing to the cooling of the air which is conducted into the aircraft cabin.

It is an object of the invention to provide a means for replenishing air in an aircraft cabin, having a duct through which the air passes into the cabin, there being an air operated engine in said duct which is driven by the air moving therethrough, this engine by its consumption of power from the air, absorbing heat from the air, and the power from the engine acting to operate a supplementary cooling means, whereby the replenished air is cooled either before or after it reaches the cabin.

A further object of the invention is to provide a means for replenishing the air in an aircraft cabin having a duct through which the replenishment air is passed into the cabin, there being an air turbine in this duct which is driven by the flow of replenishment air and which operates refrigerating equipment for cooling the air.

It is a further object of the invention to provide an air replenishment system for an aircraft cabin having a pair of ducts through which a flow of air is conducted, the first of these passages being connected to the aircraft cabin and having a cooler therein, such as an evaporator of a refrigeration system, the other of said passages having a condenser exposed to the flow of air through the passage, there being a refrigeration system including a compressor and the aforementioned condenser and evaporator, and one of the air passages having therein an air driven motor for driving the compressor.

Further objects and advantages of the invention will be brought out in the following part of the specification.

Referring to the drawings which are for illustrative purposes only,

Fig. 2 is a schematic view showing an alternative form of the invention.

Figure 1:
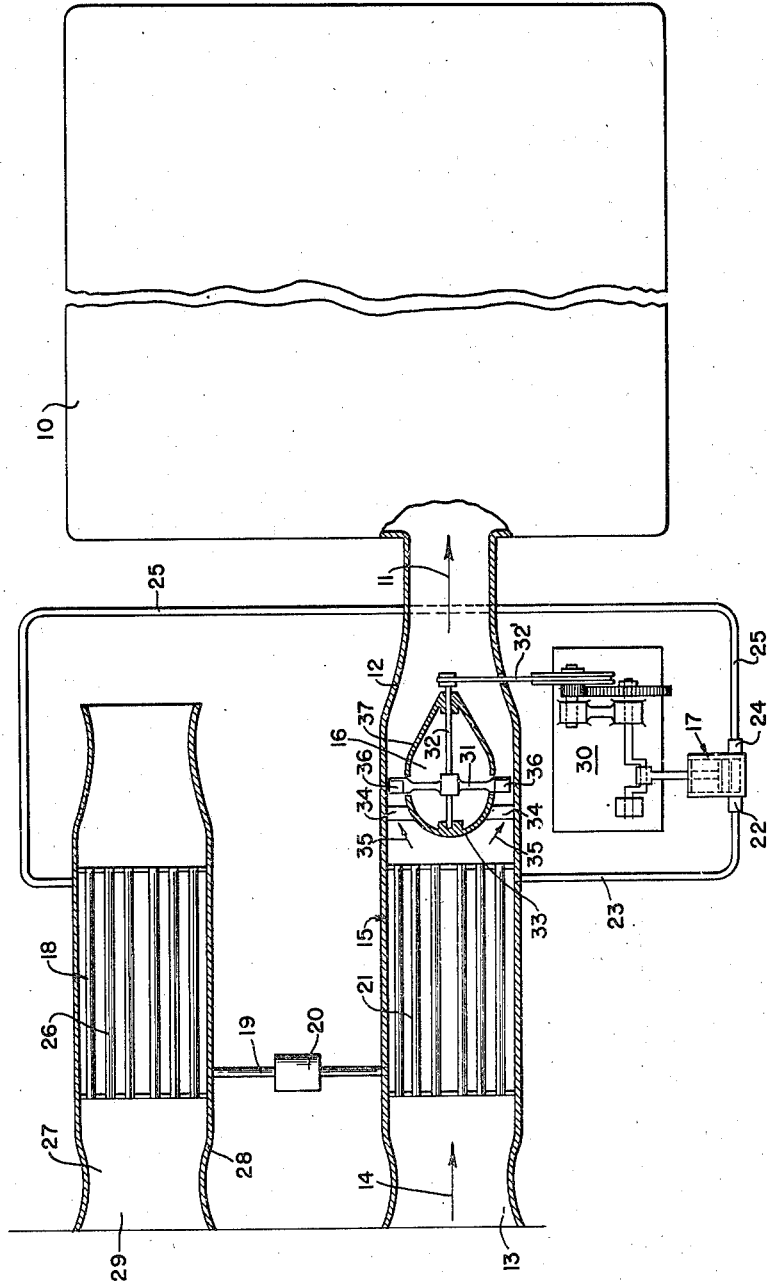
Fig. 1 is a schematic view of a preferred embodiment of my invention.

Referring to Fig. 1 of the drawings, I have shown an aircraft cabin 10 into which replenishment air is fed through a path of flow 11, defined by a duct 12, having its mouth 13 presented in the direction of movement of the aircraft through the air so as to produce an air scoop into which atmospheric air will be rammed as indicated by the arrow 14, as the result of the forward movement of the mouth 13 at high velocity relatively to the external air.

It will be recognized that air which is conducted from the external atmosphere into the cabin 10 must be, in a very short space of time, changed from relatively static condition to a velocity corresponding to that of the forward relative speed of the aircraft. This means that considerable work is done upon the air with the result that the heat content of the air is materially increased.

If the aircraft is operated at relatively high speed, this heating of the air requires that if conditions within the aircraft cabin are to be maintained within livable range, heat must be absorbed from the replenishment air either after it enters the cabin or at some point along the point of flow 11. In my present invention I provide in the duct 12 a cooler 15 which absorbs heat from the replenishment air and thereby maintains acceptable or livable temperatures within the cabin 10. A further feature of the invention is that I provide also in the path of flow 11 for the air, power consuming means 16 which, by reason of its power absorption, likewise absorbs heat from the replenishment air, and I have found that under some conditions—for example, when the aircraft is not flying at too high a rate of speed—this power and heat absorbing means 16 will reduce the temperature of the replenishment air sufficiently to maintain livable conditions in the cabin 10, although the temperature in the cabin may not be quite low enough for complete comfort.

The cooler 15 forms part of a refrigerating unit, which, as diagrammatically shown, includes a compressor 17 for a refrigerant, a means 18 for absorbing heat from the compressed refrigerant, and a conduit 19 having therein an expansion valve 20, for feeding the compressed and cooled refrigerant into the cooler 15 which is an expansion chamber traversed by tubes or air ducts 21 through which the replenishment air passes, the result being that the heat required by the refrigerant in its expansion is taken from the replenishment air flowing in the duct 12.

The compressor 17 has an intake valve 22 connected by conduit 23 with the expansion chamber 15, and has a discharge valve 24 which is connected by a conduit 25 with the interior of the cooler 18 which is a condenser for the compressed refrigerant and may have tubes 26 through which air is conducted to carry off the heat which must be removed from the compressed refrigerant. The cooler or condenser 18 is disposed in a second path of flow of air 27 defined by a duct 28 having a forwardly presented mouth 29. The compressor 17 is driven through suitable transmission 30 from the power absorbing means 16 which consists of an air driven motor having as the acting element thereof a turbine wheel 31 mounted on a shaft 32 arranged through a belt and pulley arrangement 32' to drive the transmission 30.

The air driven motor or turbine 16 has a rounded nose or body 33 presented toward or against the direction of flow of air in the duct 12, this body 33 defining in the duct 12 an annular passage 34 into which the flow of replenishment air is diverted as indicated by arrows 35. The turbine wheel 31 has turbine vanes 36 which project into the passage 34, whereby the turbine wheel 31 is caused to rotate at high velocity and thereby drive the compressor 17 at the desired speed. Following the turbine wheel 31 I provide a streamlined filler member 37 along which the air may flow with minimum turbulence after leaving the zone of the vanes 36 of the turbine wheel 31.

Although the air driven motor 16 may be placed ahead of the cooler 15 in the conduit 12, I prefer to place the motor 16 in a position following the cooler 15, as shown, for the reason that a more efficient heat transfer is obtained between the refrigerant and the air at the greater temperature differential between the air and the refrigerant when the parts are placed as shown.

In the form of the invention shown in Fig. 2 I disclose a feature of my invention which resides in the placing of the compressor of the refrigerating unit within the filler member 37 which is disposed in following relation to the turbine wheel 31. Otherwise, the parts disclosed in Fig. 2 are the same as shown in Fig. 1 and the same numerals have been applied thereto so that repetition of detailed description will be unnecessary.

For the purpose of conserving weight and consolidating the refrigerating unit in a single structure, I connect the shaft 32 of the air driven motor 16 directly to a small centrifugal or rotary compressor 17a which is located within the member 37. The conduit 23 in this practice of the invention connects the outlet of the expansion chamber 15 directly with the inlet of the compressor 17a and the outlet of the compressor 17a is connected by the conduit 25 with the condenser 18. In this form of the invention there is a considerable reduction in weight, which is an important factor to be considered in devices intended for use on aircraft. Furthermore, installation problems are minimized and the reliability of the device is increased since the number of parts and their cooperating relation is simplified and belt replacement becomes entirely unnecessary. Otherwise, the apparatus shown in Fig. 2 has the same operating characteristics as those which have been described with relation to Fig. 1.

I claim as my invention:

1. In means associated with an aircraft cabin for cooling replenishment air, the combination of: first and second air ducts through which flows of air are conducted when the aircraft is in motion; means connecting the first of said ducts to said cabin; an air driven motor in one of said ducts arranged to be driven by the flow of air therethrough; and a refrigeration unit driven by said motor, said unit having compressor means for compressing a refrigerant, air cooled means in said second duct for cooling the compressed refrigerant, and an expansion chamber for the cooled refrigerant associated with said first duct so as to absorb heat from the air which passes through said first duct.

2. In means associated with an aircraft cabin for cooling replenishment air, the combination of: first and second air ducts through which flows of air are conducted when the aircraft is in motion; means connecting the first of said ducts to said cabin; an air driven motor in said first duct arranged to be driven by the flow of air therethrough; and a refrigeration unit driven by said motor, said unit having compressor means for compressing a refrigerant, air cooled means in said second duct for cooling the compressed refrigerant, and an expansion chamber for the cooled refrigerant associated with said first duct so as to absorb heat from the air which passes through said first duct.

3. In means associated with an aircraft cabin for cooling replenishment air, the combination of: first and second air ducts through which flows of air are conducted when the aircraft is in motion; means connecting the first of said ducts to said cabin; a rounded air diversion body disposed in one of said ducts facing against the direction of flow of the air, said body defining an annular space within the duct through which the air may flow onward; a turbine wheel supported for rotation against the rear face of said body, and turbine blades extending therefrom into said annular space; a streamlined filler member following said turbine wheel; and a refrigeration unit driven by said turbine wheel, said unit having compressor means for compressing a refrigerant, air cooled means in said second duct for cooling the compressed refrigerant, and an expansion chamber for the cooled refrigerant associated with said first duct so as to absorb heat from the air which passes through said first duct.

4. In means associated with an aircraft cabin for cooling replenishment air, the combination of: first and second air ducts through which flows of air are conducted when the aircraft is in motion; means connecting the first of said ducts to said cabin; a rounded air diversion body disposed in the first of said ducts facing against the direction of flow of the air, said body defining an annular space within the duct through which the air may flow onward; a turbine wheel supported for rotation against the rear face of said body, and turbine blades extending therefrom into said annular space; a streamlined filler member following said turbine wheel; and a refrigeration unit driven by said turbine wheel, said unit having compressor means for compressing a refrigerant, air cooled means in said second duct for cooling the compressed refrigerant, and an expansion chamber for the cooled refrigerant associated with said first duct so as to absorb heat from the air which passes through said first duct.

5. In means associated with an aircraft cabin for cooling replenishment air, the combination of: means for establishing a path of flow of replenishment air into the cabin; refrigerating means in said path of flow to cool the replenishment air; and means in said path of flow, between said refrigerating means and the cabin, having power absorbing parts driven by the flow of air in said path and connected to said refrigerating means so as to drive the same, the absorbing of power by said parts extracting heat from the replenishment air.

6. In means associated with an aircraft cabin for cooling replenishment air, the combination of: means for establishing a path of flow of replenishment air into the cabin; and an air driven refrigeration unit for cooling said replenishment air.

7. In means associated with an aircraft cabin for cooling replenishment air, the combination of: means for establishing a path of flow of replenishment air into the cabin; an air driven motor in said path of flow of air; and a refrigeration unit driven by said motor for cooling the replenishment air.

8. In means associated with an aircraft cabin for cooling replenishment air, the combination of: means for establishing a path of flow of replenishment air into the cabin; means establishing a second path of flow of air; and air driven motor in one of said paths of flow of air; and refrigerant means for cooling the replenishment air having compressor means driven by said motor for compressing a refrigerant, air cooled means in said second path of flow of air for cooling the compressed refrigerant, and an expansion chamber to receive the cooled refrigerant, for extracting heat from the replenishment air.

9. In means associated with an aircraft cabin for cooling replenishment air, the combination of: means for establishing a path of flow of replenishment air into the cabin; means establishing a second path of flow of air; an air driven motor in the first of the paths of flow of air; and refrigerant means for cooling the replenishment air having compressor means driven by said motor for compressing a refrigerant, air cooled means in said second path of flow of air for cooling the compressed refrigerant, and an expansion chamber in said first path of flow of air to receive the cooled refrigerant, for extracting heat from the replenishment air.

10. In means associated with an aircraft cabin for cooling replenishment air, the combination of: first and second air ducts through which flows of air are conducted when the aircraft is in motion; means connecting the first of said ducts to said cabin; a rounded air diversion body disposed in one of said ducts facing against the direction of flow of the air, said body defining an annular space within the duct through which the air may flow onward; a turbine wheel supported for rotation against the rear face of said body, and turbine blades extending therefrom into said annular space; a streamlined filler member following said turbine wheel; and a refrigeration unit driven by said turbine wheel, said unit having within said streamlined filler member a compressor means for compressing a refrigerant, air cooled means in said second duct for cooling the compressed refrigerant, and an expansion chamber for the cooled refrigerant associated with said first duct so as to absorb heat from the air which passes through said first duct.

WALDEMAR F. MAYER.